US008581163B2

(12) United States Patent
Grehant et al.

(10) Patent No.: US 8,581,163 B2
(45) Date of Patent: Nov. 12, 2013

(54) AUTOMATED CONTROL METHOD FOR A SOLAR PROTECTION SCREEN INSTALLATION COMPRISING RETROREFLECTING-TYPE SLATS

(75) Inventors: Bernard Grehant, Nancy-sur-Cluses (FR); Eric Lagarde, Sallanches (FR)

(73) Assignee: Somfy SAS, Cluses (FR)

( * ) Notice: Subject to any disclaimer, the term of this patent is extended or adjusted under 35 U.S.C. 154(b) by 527 days.

(21) Appl. No.: 12/740,163

(22) PCT Filed: Oct. 31, 2008

(86) PCT No.: PCT/IB2008/054539

§ 371 (c)(1),
(2), (4) Date: Apr. 28, 2010

(87) PCT Pub. No.: WO2009/057077

PCT Pub. Date: May 7, 2009

(65) Prior Publication Data

US 2010/0262292 A1 Oct. 14, 2010

(30) Foreign Application Priority Data

Oct. 31, 2007 (FR) .................................... 07 07667

(51) Int. Cl.
*G01C 21/02* (2006.01)

(52) U.S. Cl.
USPC ........................................................ 250/203.4

(58) Field of Classification Search
USPC ............................... 250/203.4; 160/1, 5, 129
See application file for complete search history.

(56) References Cited

U.S. PATENT DOCUMENTS

| | | | | |
|---|---|---|---|---|
| 2,209,355 | A | 7/1940 | Schmitz | |
| 4,292,763 | A | 10/1981 | Barnes et al. | |
| 4,841,672 | A * | 6/1989 | Nebhuth et al. | 49/25 |
| 5,142,133 | A * | 8/1992 | Kern et al. | 250/203.4 |
| 6,240,999 | B1 | 6/2001 | Koster | |
| 6,367,937 | B2 | 4/2002 | Koster | |
| 6,397,917 | B1 | 6/2002 | Levert | |
| 6,845,805 | B1 | 1/2005 | Koster | |
| 7,193,201 | B2 | 3/2007 | Motte | |
| 7,417,397 | B2 * | 8/2008 | Berman et al. | 318/468 |

FOREIGN PATENT DOCUMENTS

| | | | |
|---|---|---|---|
| DE | 4239003 | A | 5/1993 |
| DE | 19632684 | A | 2/1998 |
| DE | 10050409 | A | 4/2002 |
| EP | 0 303 107 | B | 6/1993 |
| FR | 2448619 | A | 9/1980 |
| FR | 2574469 | A | 6/1986 |
| GB | 2044328 | A | 10/1980 |
| WO | WO 01/02687 | A | 1/2001 |

OTHER PUBLICATIONS

Book Summary for *Dynamic Daylighting Architecture: Basics, Systems, Projects*, Author: Koster, Helmut, ISBN 3-7643-6730-X, Publisher: Birkhauser, 2004, 1 page.

* cited by examiner

*Primary Examiner* — Thanh Luu
*Assistant Examiner* — Renee Naphas
(74) *Attorney, Agent, or Firm* — Frommer Lawrence & Haug LLP; Ronald R. Santucci

(57) ABSTRACT

An automated control method for a solar protection screen (SCR) installation (INST) comprising retroreflecting-type slats (B1, B2, B3) which can be inclined between two extreme inclinations, wherein, in the presence of direct solar radiation, the slats are inclined at a first intermediate inclination, equal to the maximum aperture inclination (AMAX) of the screen relative to a preferred direction, as long as an inclination threshold automatically controlled in relation to the height of the sun (ATH) remains less than the maximum aperture inclination.

20 Claims, 1 Drawing Sheet

AUTOMATED CONTROL METHOD FOR A SOLAR PROTECTION SCREEN INSTALLATION COMPRISING RETROREFLECTING-TYPE SLATS

This application is a 371 of PCT/IB2008/054539 filed on Oct. 31, 2008, published on May 7, 2009 under publication number WO 2009/057077 A which claims priority benefits from French Patent Application Number 07 07667 filed Oct. 31, 2007, the disclosure of which is incorporated herein by reference.

BACKGROUND OF THE INVENTION

The invention relates to the automated control of slatted blinds, in particular when the slats have a retroreflecting-type effect.

Depending on the case, these slats are slightly dished upward or downward.

DESCRIPTION OF THE PRIOR ART

Such blinds are described in the U.S. Pat. No. 6,367,937, U.S. Pat. No. 6,845,805 and U.S. Pat. No. 6,240,999, and in the work entitled "Dynamic Daylighting Architecture" by Helmut Köstler-Birkhäuser—ISBN 3-7643-6730-X.

Such blinds are designed for fixed positioning. The drive system is envisaged mainly for a deployment/retraction operation, for example to enable the windows to be cleaned.

These blinds cannot be controlled automatically in the conventional way.

It is known practice, in the presence of direct sunlight, to orient the median plane of the conventional blind slats in such a way that it is substantially perpendicular to the solar rays. In some cases, as in the U.S. Pat. No. 5,142,133, an electronic device automatically controls the position of the slats so as to obtain this perpendicular situation. This electronic device 22 comprises two photodiodes, and the inclination of the slats is controlled automatically so as to obtain equal amounts of incident radiation on each photodiode. A second photodetector device 24 controls the retraction of the blind as a whole as a function of the background brightness of the sky. When the background brightness becomes less than a given threshold, the blind is retracted. This second photodetector is also used to switch from an automatic orientation control mode to a "slats-horizontal" orientation mode during a cloudy period (see col. 6 l 25-41).

This document proposes this automatic control device to avoid having to use an astronomical clock of the "sun-tracking" type that is known for determining the apparent position of the sun in the sky and orienting the slats accordingly.

Now, a different regulation mode must be implemented on the slats that have a retroreflecting effect, while the substantially perpendicular orientation mode will preferentially be applied to other situations described in the invention.

The aim of the invention is to remedy the inadequacies of the prior art by proposing a control device that is suitable for this type of slats, whether they have a horizontal axis or a vertical axis.

The prior art describes numerous configurations in which reflecting slats are used in a solar protection screen, the U.S. Pat. No. 2,209,355 being probably one of the oldest documents.

The U.S. Pat. No. 6,397,917 provides a dual drive system for separate orientation of the top part and the bottom part of the screen. The slats are not retroreflecting.

The patent EP 0 303 107 describes slats that are reflecting on their top face and retroreflecting in at least a portion of the bottom face. The slats are preferentially fixed.

The patent application FR 2 574 469 describes flat or only slightly concave slats that are reflecting in their top face, with variable orientation depending on the season (winter/summer), a mechanism being able to slightly modify the inclination of the slats.

The patent application DE 42 39 003 proposes a mechanism for diffusing direct solar radiation toward the interior of the room by means of successive reflections between the top face of a reflecting slat and the bottom face of the slat situated above, which is also reflecting.

The U.S. Pat. No. 4,292,763 provides for slightly concave reflecting slats, which are normally used in a quasi-horizontal position to reflect the light toward the ceiling of the room, to be able also to be used when the screen is in the closed position.

The patent application FR 2 448 619 provides slats that can be oriented and whose top face reflects while the bottom face absorbs.

For such slats with reflecting top face and absorbing bottom face, which are very concave, the patent application DE 100 50 409 proposes an automatic orientation device that does away with an astronomical clock (time and date) by using a sensor situated at the slat edge to detect the focusing off the direct solar radiation reflected off the slat below, and driving the orientation of the slats in order to prevent the reflected solar radiation from reaching the absorbing portion of the slat when the season is summer.

SUMMARY OF THE INVENTION

The aim of the invention is to provide a control method that avoids the previously stated drawbacks and improves on the control methods known from the prior art. In particular, the invention proposes a control method for a protection screen that makes it possible to obtain optimum visual comfort inside a space equipped with the screen.

According to a first aspect, the method according to the invention is defined by claim 1.

Various embodiments of the method are defined by claims 2 to 14.

According to this first aspect, the motor-driven solar protection screen installation is defined by claim 15.

According to a second aspect, the method according to the invention is defined by claim 16.

Various embodiments of the method are defined by claims 17 to 20.

BRIEF DESCRIPTION OF THE DRAWING

The appended drawing represents, by way of example, an embodiment of a solar protection installation according to the invention and an embodiment of a control method for such an installation.

DESCRIPTION OF THE PREFERRED EMBODIMENTS

The installation INST comprises a solar protection screen SCR consisting of slats B1, B2, B3 (or B'1, B'2, B'3) guided in terms of orientation by ladders L1 and L2 connected to a motor MOT.

The screen SCR is positioned behind a frontage window GLZ, in a space situated inside a building. Alternatively, the screen is positioned in front of the window, outside the building.

The slats are of retroreflecting, or catadioptric, type. Ideally, any ray incident on the slat is reflected in the incident direction. The behavior of a slat will here be said to be retroreflecting if this property is borne out overall, that is to say if, for at least the majority of the incident rays and of the points of incidence, any reflected ray is emitted in a cone of weak aperture (for example 30°) that includes the incident direction. The behavior may be retroreflecting within only a certain range of relative inclinations of the incident rays relative to the slats. Outside of such a range of inclinations, some of the direct solar rays are not retroreflected, and therefore pass into the space.

Such a screen is, for example, described in the U.S. Pat. No. 6,845,805, or even in the U.S. Pat. No. 6,367,937.

Figure 1:
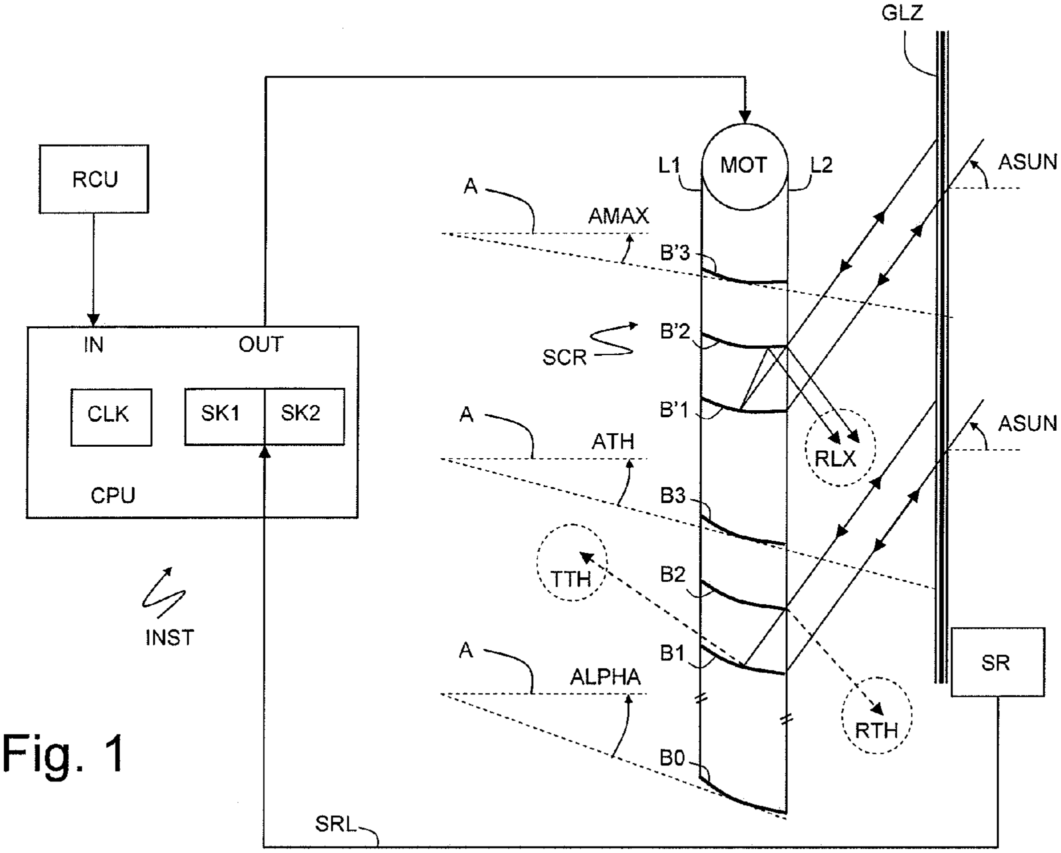
FIG. 1 is a diagram of an embodiment of a solar protection installation according to the invention.

In FIG. 1, the solar rays arrive from the right of the screen, and the interior of the building, where the user is situated, is to the left of the screen.

The figure shows the screen in two different orientations, obtained by the action of the motor MOT, for one and the same angle of incidence ASUN of the direct solar radiation, in order to show the effects of the orientation of the slats on the reflection.

Right at the bottom of the screen, a slat B0 is represented at an arbitrary inclination ALPHA.

The inclination is represented as being the acute angle formed algebraically between a reference plane tangential to the slats and a horizontal plane A. Because of the potentially complex shapes of the slats, the reference plane can be taken to be the plane including the points of attachment of the slat to the ladder-form supporting cords. The angular difference resulting from the choice of one reference plane rather than another is reflected in a constant offset that is not involved in the control method.

The bottom part of the screen then represents three slats B1-B3 at a first particular inclination ATH.

The direct solar radiation arrives at a top portion of the first slat B1. At the first particular inclination ATH, all the light is retroreflected, which is indicated in the form of bidirectional arrows. As already specified, depending on the geometry of the slat, the retroreflection is not necessarily truly ideal (return in the exact direction of incidence) and can amount to a focusing of the reflected rays in any plane outside the screen (and to the right of the latter).

However, at this first particular inclination, a portion of the reflected radiation is just at the limit of encountering the bottom part of the second slat B2 and being reflected thereof, as shown by a dotted arrow RTH.

Alternatively, the first particular inclination corresponds to the limit of appearance of non-retroreflected rays, that is to say rays reflected while penetrating into the room, as indicated by a dotted arrow TTH.

In all cases, the first particular inclination ATH, also called “inclination threshold” or “automatically controlled threshold”, is dependent on the angle of incidence ASUN of the direct solar radiation.

The threshold automatically controlled in relation to the angle of incidence is defined as the limit inclination for which direct solar rays are retroreflected by the slats without affecting the other slats or, alternatively, is defined as the limit inclination for which direct solar rays are reflected by the slats without there being any retroreflection.

The top portion of the screen represents three slats B'1-B'3 at a second particular inclination AMAX.

The three slats B'1-B'3 are, for example, the preceding slats B1-B3, shown in a different angular position.

The second particular inclination AMAX is visually more advantageous than the first inclination, because it gives a better view of the outside through the screen, the slats being less inclined. The particular inclination AMAX corresponds to the maximum aperture inclination of the screen relative to a preferred direction, that is to say a position of inclination of the slats in which the areas of the slats projected in this preferred direction are minimal.

This inclination is independent of the angle of incidence ASUN of the solar radiation. It is a value that can be set by the manufacturer or determined by learning (by the installer or by the occupant), because it is not mandatory for it to be the horizontal view that is favored. On the contrary, it is possible for the occupant of an office situated on an upper floor to want to favor a view that is inclined toward the ground. In this case, the inclination AMAX may be significantly greater than represented in FIG. 1. The particular inclination AMAX corresponds to a position of inclination of the slats in which the areas of the slats projected in the direction of the view favored by the occupant are minimal.

However, it appears that, for the same solar inclination as previously, a portion of the radiation retroreflected off the first slat is reflected significantly off the second slat, and gives rise to a spurious reflected radiation RLX that is likely to be a source of nuisance in the vicinity. This spurious reflected radiation can also be reflected off the window GLZ, and give rise to a second incidence of solar radiation that is impossible to control.

In order to apply the control method according to the invention, the installation comprises a control unit CPU, and a remote control unit RCU, which can be activated by the user occupying the space and linked to an input IN of the control unit CPU. An output OUT of the control unit can be used to activate the slat orientation motor MOT in one or the other direction. Details of the kinematic chain are not shown. The control unit notably comprises software means for governing operation of the installation according to the method that is the subject of the invention, one embodiment of which is described in detail below. In particular, these software means comprise computer programs.

The installation can in particular comprise a means of determining a first particular inclination ATH of the slats defined as being the inclination for which the direct solar rays are retroreflected by the slats without affecting the other slats or, alternatively, defined as the limit inclination for which direct solar rays are reflected by the slats without there being any retroreflection, and/or a means of determining a second particular inclination AMAX of the slats defined as the maximum aperture inclination of the screen relative to a preferred direction and/or a means of detecting direct solar rays and/or a means of orienting the slats and/or a means of comparing the values of the first and second particular inclinations.

Furthermore, the installation comprises a sensor SR, linked to the control unit by a link SRL. The sensor is used to generate, in the control unit CPU, at least two information items concerning the state of the sky.

A first information item SK1 indicates the presence of direct solar radiation on the window GLZ. A second information item SK2 indicates at least partial luminance of the sky above a given threshold. In the absence of direct sunlight, the sky may have, overall or locally, a strong luminance because of diffusion or because of the reflection of the sunlight off light surfaces (clouds, neighboring buildings, etc.) as described in the U.S. Pat. No. 7,193,201, which results in visual discomfort.

The control unit CPU finally comprises an astronomical clock CLK. This should be understood to be a device that gives the current value of the height of the sun (equal to the angle of incidence ASUN) based on the solar time and on the date and comprising the calculation means needed to determine, periodically, the current value of the inclination threshold ATH, that is to say, the position of inclination automatically controlled in relation to the height of the sun. These calculation means include a model of daily and seasonal variation for which the parameters (such as latitude, longitude, inclination of the blind relative to the vertical, exposure of the blind in relation to cardinal points, the dimensions and spacings of the slats) can be defined at the time of installation. For example, these parameters may be input using a human-machine interface of the installation. Alternatively, some of these parameters may be determined automatically during installation after an installer or a user has stored, at certain dates, one or more particular inclination positions for the slats in which the direct solar rays are reflected by the slats without affecting the other slats and without passing through the blind or by reflection off the slats, or has stored, at certain dates, one or more particular inclination positions of the slats in which the direct solar rays are retroreflected by the slats without affecting the other slats.

A safety margin of a few degrees is advantageously included in the threshold value ATH, so as to avoid undesirable first reflection situations if the model of daily and seasonal variation is not sufficiently accurate, and/or if the parameters of this model have not been determined with sufficient care.

Moreover, the installer defines the maximum aperture inclination AMAX according to the wishes of the user and/or the configuration of the room (view, upper floor or first floor).

Figure 2:
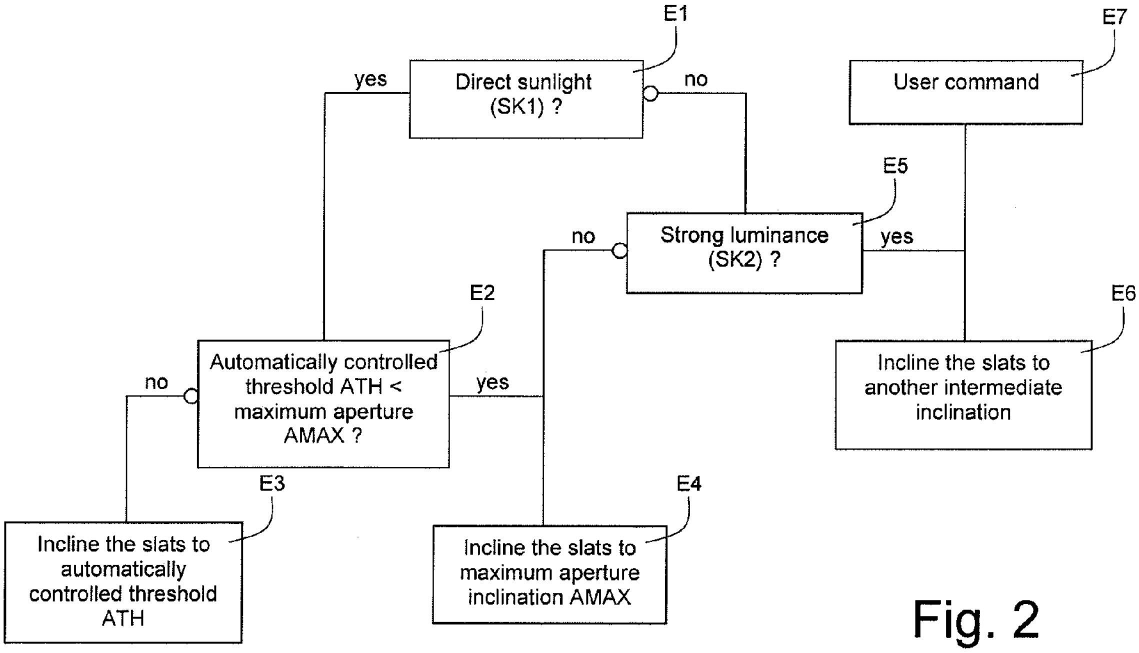
FIG. 2 is a flow diagram of an embodiment of a solar protection installation control method according to the invention.

The control method according to the invention is described with reference to FIG. 2.

In a first step E1, the presence of direct sunlight is tested. If the first information item SK1 indicates the presence of direct sunlight on the window GLZ, then the method goes on to a second step E2, otherwise it goes on to a fifth step E5.

In the second step E2, the current value of the inclination threshold ATH (or automatically controlled threshold) is compared to the maximum aperture inclination AMAX. If the inclination threshold ATH is greater than the maximum aperture inclination AMAX, then the method goes on to a third step E3, in which the control unit delivers to the motor the signals needed to orient the slats at a first orientation equal to the inclination threshold ATH.

This is done because this situation in which the inclination threshold ATH is greater than the maximum aperture inclination AMAX corresponds to that of FIG. 1, in which there would be significant spurious reflection if the maximum aperture inclination were maintained.

If the inclination threshold ATH is less than the maximum aperture inclination AMAX, then the method goes on to a fourth step E4, in which the control unit delivers to the motor the signals needed to orient the slats at a first orientation equal to the maximum aperture inclination AMAX: the view toward the outside may be favored without any drawbacks.

Thus, in the presence of direct solar radiation, the slats are inclined at a first intermediate inclination which is equal to the maximum aperture inclination of the screen as long as the inclination threshold automatically controlled in relation to the height of the sun remains less than the maximum aperture inclination, and which is equal to the inclination threshold in the contrary case.

During the fifth step E5, reached in the absence of direct solar radiation, the sky luminance information item is tested. If the overall or local luminance is not considered to be strong, then the method goes on to the fourth step E4 for orientation of the slats at the maximum aperture inclination AMAX. If the overall or local luminance is considered to be strong, then the method goes on to a sixth step E6 in which the slats are oriented at a second orientation. This second orientation corresponds to an inclination of high value (close to 90°) at least such that the median plane of the slats is substantially perpendicular to the direction of strongest sky luminance. If the sky is uniformly bright (situation known as "white sky"), then this second orientation is preferentially an extreme inclination of the slats making it possible to fully close the screen or approach said full closure.

In a simplified manner, this second orientation is predefined by the manufacturer or following a learning stage.

In a more sophisticated variant, this value is determined by the sensor SR and the control unit CPU after analyzing the state of the sky and possibly identifying a direction of strongest luminance.

A specific user command, activated during a seventh step E7 on the remote control unit RCU, enables the sixth step E6 to be activated at any instant, in a manner that takes priority over the automated actions.

On completion of the steps E3, E4 and E6, the method loops, after a possible time delay, to the first step E1 (loop-back not shown).

Preferentially, the maximum aperture inclination (AMAX) of the screen relative to a preferred direction has a default value (for example zero) as long as no other value is defined by the user. The definition of this other value can be done simply, for example, with the two buttons of a remote control RCU, the user orienting the slats until they reach a preferred inclination enabling said user to optimize the view in a given direction. Once this inclination is obtained, the user presses both buttons simultaneously. The current position of the motor is then stored in memory in the control unit CPU, and this value corresponds to the maximum aperture inclination.

As a variant, several reference values can be stored by the user for the maximum aperture inclination (AMAX), for example a summer value and a winter value, or even a morning value and an afternoon value. These reference values are placed in a table of maximum aperture inclination values, relative to the user preference criteria, and the current value of the maximum aperture inclination is automatically read from this table according to the value of the preference criterion.

In the present application, the terms "orientation" and "inclination" are synonymous, but the terms "intermediate inclination" and "particular inclination" are not.

The invention claimed is:

1. An automated control method for a solar protection screen (SCR) installation (INST) comprising retroreflecting-type slats (B1, B2, B3) which can be inclined between two extreme inclinations, wherein, in the presence of direct solar radiation, the slats are inclined at a first intermediate inclination, equal to the maximum aperture inclination (AMAX) of the screen relative to a preferred direction, as long as an inclination threshold automatically controlled in relation to the height of the sun (ATH) remains less than the maximum aperture inclination, wherein the maximum aperture inclination (AMAX) of the screen relative to the preferred direction is a position of inclination of the slats in which the areas of the slats projected in the preferred direction are minimal with respect to a view, wherein the inclination threshold automatically controlled in relation to the height of the sun (ATH) is determined by application of a model of daily and seasonal variation;

wherein parameters of the model of daily and seasonal variation are determined by a learning step in which an operator moves the slats so as to position them at a setting inclination, this setting inclination being the limit inclination of the slats in which the direct solar rays are reflected by the slats without affecting the other slats; and wherein the inclination threshold automatically controlled in relation to the height of the sun (ATH) is defined to be dependent on the angle of incidence (ASUN) of direct solar radiation, the definition being the limit inclination for which direct solar rays are retroreflected by the slats without affecting the other slats.

2. The control method as claimed in claim 1, wherein, in the presence of direct solar radiation, the first intermediate inclination becomes equal to the inclination threshold automatically controlled in relation to the height of the sun (ATH) when the latter is greater than the maximum aperture inclination (AMAX).

3. The control method as claimed in claim 1, wherein the slats are placed at the maximum aperture inclination (AMAX) when the sky has no areas of strong luminance.

4. The control method as claimed in claim 1, wherein the slats are placed at a second inclination when one of the following events occurs:

command from the user, detection of at least one area of strong sky luminance, excluding direct sunlight.

5. The control method as claimed in claim 4, wherein the second inclination is one of the extreme inclinations, this inclination being such that the screen is substantially closed to any light transmission.

6. The control method as claimed in claim 4, wherein when the event is the detection of at least one area of strong sky luminance, the second inclination corresponds to a position of the slats that is substantially perpendicular to the direction of strong sky luminance.

7. The control method as claimed in claim 1, wherein the maximum aperture inclination (AMAX) of the screen relative to a preferred direction has a default value as long as another value is not defined by the user.

8. The control method as claimed in claim 7, wherein the default value is zero degrees with respect to the ground.

9. The control method as claimed in claim 1, wherein the maximum aperture inclination (AMAX) of the screen relative to a preferred direction is automatically chosen from a table of values relative to user preference criteria.

10. A motor-driven solar protection screen installation (INST) comprising retroreflecting-type slats (B1, B2, B3) which can be inclined between two extreme inclination positions, wherein said installation comprises hardware means (CPU, CLK, SK1, SK2, MOT) and software means for implementing the control method as claimed in claim 1.

11. An automated control method for a solar protection screen (SCR) installation (INST) comprising retroreflecting-type slats (B1, B2, B3) which can be inclined between two extreme inclinations, wherein, in the presence of direct solar radiation, the slats are inclined at a first intermediate inclination, equal to the maximum aperture inclination (AMAX) of the screen relative to a preferred direction, as long as an inclination threshold automatically controlled in relation to the height of the sun (ATH) remains less than the maximum aperture inclination, wherein the maximum aperture inclination (AMAX) of the screen relative to the preferred direction is a position of inclination of the slats in which the areas of the slats projected in the preferred direction are minimal with respect to a view, wherein the inclination threshold automatically controlled in relation to the height of the sun (ATH) is determined by application of a model of daily and seasonal variation; wherein parameters of the model of daily and seasonal variation are determined by a learning step in which an operator moves the slats so as to position them at a setting inclination, this setting inclination being the limit inclination of the slats in which direct solar rays are not retroreflected by the slats; and wherein the inclination threshold automatically controlled in relation to the height of the sun (ATH) is defined to be dependent on the angle of incidence (ASUN) of direct solar radiation, the definition being the limit inclination for which direct solar rays are reflected by the slats without retroreflection.

12. The control method as claimed in claim 11, wherein, in the presence of direct solar radiation, the first intermediate inclination becomes equal to the inclination threshold automatically controlled in relation to the height of the sun (ATH) when the latter is greater than the maximum aperture inclination (AMAX).

13. The control method as claimed in claim 11, wherein the slats are placed at the maximum aperture inclination (AMAX) when the sky has no areas of strong luminance.

14. The control method as claimed in claim 11, wherein the slats are placed at a second inclination when one of the following events occurs:

command from the user, detection of at least one area of strong sky luminance, excluding direct sunlight.

15. The control method as claimed in claim 14, wherein the second inclination is one of the extreme inclinations, this inclination being such that the screen is substantially closed to any light transmission.

16. The control method as claimed in claim 14, wherein when the event is the detection of at least one area of strong sky luminance, the second inclination corresponds to a position of the slats that is substantially perpendicular to the direction of strong sky luminance.

17. The control method as claimed in claim 11, wherein the maximum aperture inclination (AMAX) of the screen relative to a preferred direction has a default value as long as another value is not defined by the user.

18. The control method as claimed in claim 17, wherein the default value is zero degrees with respect to the ground.

19. The control method as claimed in claim 11, wherein the maximum aperture inclination (AMAX) of the screen relative to a preferred direction is automatically chosen from a table of values relative to user preference criteria.

20. A motor-driven solar protection screen installation (INST) comprising retroreflecting-type slats (B1, B2, B3) which can be inclined between two extreme inclination positions, wherein said installation comprises hardware means (CPU, CLK, SK1, SK2, MOT) and software means for implementing the control method as claimed in claim 11.

* * * * *